United States Patent [19]

Arisawa

[11] Patent Number: 4,804,569
[45] Date of Patent: Feb. 14, 1989

[54] UNIT TILE

[75] Inventor: Tomoharu Arisawa, Tokyo, Japan

[73] Assignees: Yugen Kaisha Arisawa; Kabushiki Kaisha Towo Japan, both of Tokyo, Japan

[21] Appl. No.: 51,294

[22] Filed: May 19, 1987

[51] Int. Cl.⁴ .................. B32B 3/14; B44C 1/28
[52] U.S. Cl. ........................ 428/47; 52/315; 428/40; 428/907
[58] Field of Search ........... 428/48, 49, 907, 44, 428/40, 47; 52/315

[56] References Cited

U.S. PATENT DOCUMENTS

| | | | |
|---|---|---|---|
| 1,440,967 | 1/1923 | Carpenter et al. | 52/315 X |
| 1,619,081 | 3/1927 | McLaurin | 428/195 X |
| 2,577,270 | 12/1951 | Riley | 428/16 X |
| 3,056,224 | 10/1962 | Almy et al. | 428/48 X |
| 3,335,048 | 8/1967 | Morain | 428/48 |
| 3,875,716 | 4/1975 | Eusemann | 428/49 X |
| 3,962,504 | 6/1976 | Sherwin | 428/49 X |
| 4,107,375 | 8/1978 | Iwasaki et al. | 428/291 |
| 4,128,688 | 12/1978 | Wiley | 428/907 X |
| 4,138,299 | 2/1979 | Bolgiano | 427/44 X |
| 4,180,615 | 12/1979 | Bettoli | 428/339 |
| 4,239,797 | 12/1980 | Sachs | 428/48 X |
| 4,339,489 | 7/1982 | Barker et al. | 428/49 X |
| 4,548,008 | 10/1985 | Maeda | 428/49 X |

Primary Examiner—Henry F. Epstein
Attorney, Agent, or Firm—Parkhurst, Oliff & Berridge

[57] ABSTRACT

Unit tile comprising a tile member of a desired shape and thickness, which is made of a synthetic resinous material having flexibility, an adhesive layer formed on a rear side of the tile member, and a release paper attached to the surface of the adhesive layer to cover and protect the adhesive surface. The unit tile of the present invention is formed of a plurality of tile members. The tile members are disposed on a thin, flexible substrate, leaving spaces corresponding to joints between the respective tile members. The rear side of the substrate has the adhesive layer which is covered by the release paper. This unit tile may have marginal portions usable as overlaps for splicing. With such a configuration of the unit tile, the unit tile may easily and accurately set on walls etc., while conforming it to the configuration of the setting walls etc.

12 Claims, 2 Drawing Sheets

UNIT TILE

BACKGROUND OF THE INVENTION a. Field of the Invention

This invention relates to unit tile, which is especially suitable for decoration and protection of interior walls of a bathroom, kitchen, toilet, washroom or living room, or surfaces of furniture etc.

b. Prior Art

Heretofore, walls of a room, in which water is used, such as a bathroom, kitchen, toilet, washroom, etc. are generally covered or decorated by brick or ceramic wall tile such as mosaic tile etc. Recently, tile of synthetic resins, similar in sizes and configurations to the conventional brick or ceramic tile, have been frequently used in place of the brick or the ceramic tile.

On the other hand, decorative sheet made of paper, cloth or synthetic resin sheet having ornamental patterns printed or embossed thereon has been widely used for covering and protecting walls of a room such as a living room etc., or providing ornamental effect on the walls.

Furthermore, overlaid plywood, which is formed of paper or cloth impregnated with synthetic resins, has been used to cover surfaces of furniture etc. for the purposes of protection and decoration of the surfaces.

The ceramic wall tile as described above are usually prepared by a complicated process, which includes molding of raw materials such as kaolin or plastic clay into a shape of tile, drying and grazing the molded material and calcining the same. Moreover, the setting or installation of the tile requires troublesome operations such as placing a number of ceramic wall tile pieces on a setting bed, regularly, one by one, and thereafter finishing joints between the tile pieces.

The synthetic resin tile are also similar to the ceramic wall tile. Although the synthetic resin tile are advantageously hardwearing and can be colorful as compared with the ceramic wall tile, the setting of the synthetic resin tile is again troublesome, which comprises preliminary application of an adhesive on the surface of the setting wall or on the rear side of the synthetic resin tile and setting each piece of the synthetic resin tile on the setting wall.

Thus, the setting operation of the synthetic resin tile is as troublesome as that of the ceramic tile and it can be attained only by a time-consuming work by a skilled person. This results in high cost for tile setting and requires much time.

Moreover, the conventional tile brick have another disadvantage due to the fact that they are fixed in sizes, shapes and thicknesses, to wit, they have uniform sizes, shapes and thicknesses. More particularly, if there is some obstacle such as a faucet on a wall, to which the tile or brick are to be applied, the tile or brick should be cut out so as to avoid such an obstacle. This processing operation is quite difficult for a nonprofessional.

As to the decorative sheet, a variety of kinds of sheets are easily available in the market and they can be applied to walls or surfaces of furniture with relative ease on a do-it-yourself basis. However, the sheets are so thin that they can not protect the surfaces of the walls or furniture and can not provide a finish of voluminous appearance and feeling.

SUMMARY OF THE INVENTION

The present invention has been made to obviate the problems involved in the prior arts, and it is therefore an object of the present invention to provide unit tile, which is capable of being readily installed on interior walls of a bathroom, kitchen, toilet, washroom or living room, or being easily set on surfaces of furniture etc. as well as capable of protecting the walls of the rooms or surfaces of the furniture. The unit tile provided by the present invention has a desirable three-dimensional, voluminous impression and feeling to develop excellent decorative effects.

The present invention features unit tile comprising a tile member made of synthetic resinous material, which has flexibility and has an appropriate thickness; an adhesive layer provided on the back of the tile member; and release paper covering the surface of the adhesive layer.

In this invention, the tile member is made, for example, of a synthetic resinous material having flexibility, such as a foamed or non-foamed material of soft vinyl chloride resin, acrylic rubber, urethane resin, etc.

The tile member may be formed in any desired shape. For example, the tile member may be in a shape of square or rectangle as of conventional wall tile or brick, or circle, or may be formed in a shape of some animal, fish, or plant. Similarly, there is no limitation in color of the tile member.

The tile member may preferably be mildew-proofed and/or coated with two-pack urethane transparent coating to protect the surface of the tile member from scratching. Furthermore, the tile member may have a pattern or painting on the surface thereof.

This tile member is coated, on the back or the rear side thereof, with an adhesive to form the adhesive layer thereon. Release paper is attached to the adhesive layer of the tile member to prevent the tile.member from sticking to other things before setting the same, namely, during storage or tranportation of the tile member.

The composition of the adhesive to be applied to the tile member is not critical and any adhesive, which has good adhesiveness to a setting bed wall to which the unit tile of the present invention is applied, may be employed. In general, a known pressure-sensitive adhesive, such as rubber latex, acrylic emulsion, etc. may suitably be employed.

The release paper employable in the present invention for covering the surface of the adhesive layer may preferably be a known release paper such as silicone-impregnated paper or silicone laminated paper.

The present invention further features unit tile comprising a substrate, which comprises a sheet member of a synthetic resinous material, an adhesive layer formed of an adhesive applied to the back of the sheet member and a release paper covering the surface of the adhesive layer to protect the surface of the layer; and a plurality of tile members of a synthetic resinous material having flexibility and a substantial thickness, which are attached to the surface of the substrate with spaces between the respective tile members.

The tile members employed in this unit tile, may be mildew-proofed as in the first form of the unit tile according to the present invention. Of course, the tile members may not always be mildew-proofed. The shape or color of the tile members, or the number of the tile members to be attached to the sheet member of the substrate is not critical. A desired number of tile members of desired shape and color are regularly or irregularly placed and attached to the surface of the substrate, leaving spaces between the respective tile members. The substrate is applied, at the back thereof, preferably all over the back thereof, with an adhesive and a release sheet is attached to the surface of the adhesive surface for protection thereof.

The sheet member of the substrate may, preferably, be made of a flexible synthetic resinous material such as soft vinyl chloride resin, acrylic rubber, urethane resin, etc. The shape of the substrate is not critical, but it is preferred to have some stiffness or rigidity. If the substrate has not sufficient stiffness, there may possibly be caused partial or complete peeling or separation of the substrate from the wall, to which the unit tile is applied, or dislocation of the substrate relative to the wall, due to the weight of the tile members.

The adhesive and the release paper employable in this form of unit tile may be a pressure-sensitive adhesive and silicone release paper which are similar to those of the first form of unit tile as described above, respectively.

There is no limitation in the layout of the tile members on the substrate. The tile members are disposed with spaces corresponding to joints left between the tile members. The tile members may be layed out all over the substrate or disposed, leaving margins at peripheral portions of the substrate.

In a preferred example of the layout of the tile members on the substrate, a square or rectangular substrate having a desired length and width is used and the tile members are arranged on the substrate so that there may leave desired margins along at least two adjacent edges of the square or rectangular substrate and there may leave no margin on the remaining edge or edges of the substrate.

The tile members may preferably be disposed on an adhesive layer formed on the substrate, according to the preferred layout as described above, the adhesive surface is exposed at the spaces between the respective tile members and the marginal portions along at least two adjacent two sides of the substrate.

The adhesive-exposed portions at the spaces corresponding to joints between the respective tile members should be treated so that they may lose the adhesiveness to become non-sticky. The other adhesive-exposed portions left at the marginal portions along at least two adjacent edges of the substrate are covered by release paper, leaving strips of the exposed adhesive surface having a width corresponding to that of the joint. The strips left uncovered by the release paper are treated to lose the adhesiveness. The adhesive exposed portions covered by the release paper may, advantageously, be used as overlap widths for splicing the unit tile with another unit tile. This layout will facilitate the splicing of the unit tiles in the setting operation of the unit tiles onto the walls etc.

The treatment of the adhesive-exposed portions corresponding to the joints as mentioned above is effected by dusting or applying liquid or powder inorganic or organic substances, or applying a synthetic emulsion onto the adhesive-exposed portions.

OPERATION

As illustrated in FIG. 1, the first form of unit tile 1 according to the present invention comprises the tile member 2 made of the synthetic resin material, having the appropriate thickness and flexibility, the adhesive surface 3 formed on the rear side of the tile member 2, and the release paper 4 covering the adhesive surface 3. Therefore, for the application of the unit tile, the release paper 4 is first removed to expose the adhesive surface 3 and the adhesive surface 3 is pressed against a wall of a room etc. or a surface of furniture. The setting or installation of the unit tile thus can be accomplished easily, providing a somehow voluminous, beutifull finish to the wall or the surface of the furniture.

The unit tile 1 may be formed in the shape of fish 1a or seaweed 1b as illustrated in FIG. 4. These unit tiles 1a and 1b may, for example, be applied to a wall 15 of a unit bathroom 14 so as to expel air between the rear side of the unit tiles and the wall 15 for positively setting the unit tiles on the wall, providing three-dimensional ornamental appearance on the wall.

The second form of unit tile 5 according to the present invention is formed of the substrate 7 having the adhesive surface 10 on the rear side of the sheet member 9, the release paper 11 covering the adhesive surface 10 and the tile members 6, 6 of synthetic resin materials, having an appropriate thickness and flexibility, which are attached adhesively to the surface of the substrate 7, leaving spaces corresponding to the joints between the respective tile members, so that the tile members are set on the substrate like relief.

Prior to the application of the unit tile onto the wall etc, the surface of the wall etc. is cleaned and dried. Then the release paper 11 is released from the adhesive surface 10 to expose it and the adhesive surface 10 is pressed against the wall etc., while expelling air from between the rear side of the unit tile 5 and the wall etc. Thus, three-dimensional ornamentation is attained easily.

If there is some obstacle such as a faucet etc. on the wall, to which the unit tile 5 is to be set, the unit tile is cut out so as to conform to the shape of the obstacle by using a knife or scissors.

Or, if there are convexed or concaved portions or curved portions on the wall etc., the unit tile 5 can conform with the shapes of the portions because the unit tile 5 is made of flexible members such as the tile members 6, adhesive 10 and release paper.

Furthermore, if there is an external corner or internal corner on the walls to which the tile unit 5 is applied, the spaces 8 between the tile members 6 may be placed on the corner so as to conform the entire unit tile to the walls and the corner.

PREFERRED EMBODIMENT OF THE PRESENT INVENTION

Figure 1:
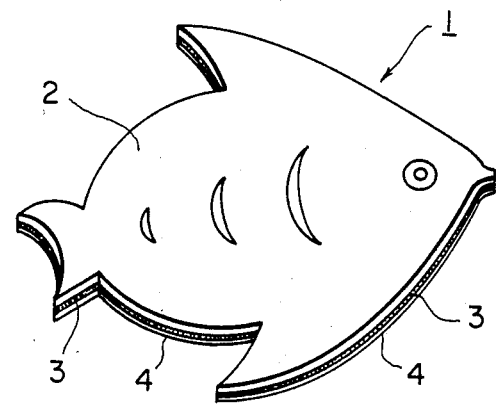
FIG. 1 is a perspective view of a first form of unit tile embodying the present invention.

Preferred embodiments of the present invention will now be described, referring to the drawings.

FIG. 1 is a perspective view of one form of unit tile embodying the present invention. The unit tile 1 comprises a tile member 2 which is made of mildew-proofed soft vinyl chloride resin sheet having a thickness of, for example, 1.2 mm and die-cut or blanked in the shape of fish. Eye and stripe are printed or drawn on the surface of the tile member 2. A pressure-sensitive acrylic emulsion adhesive is applied all over the rear surface of the tile member 2 to form an adhesive face or layer 3. The surface of the adhesive layer 3 is covered and protected by a release sheet 4 of silicone laminate.

In this embodiment, an acrylic emulsion adhesive is applied to the rear side of the tile member 2 to form the adhesive face 3 and the adhesive face 3 is protected by the release sheet 4 of silicone laminate, but a known double-coated adhesive tape may be used alternatively. In this case, one side of the tape is attached to the rear face of the tile member 2 and the other side of the tape is covered by the release sheet 4.

The so configured unit tile 1 may be easily set or installed on a surface, to which the unit tile 1 is applied: the release sheet 4 covering the rear side of the tile member 2 is first peeled off to expose the adhesive layer or surface 3; and the adhesive layer 3 is let to adhere to the surface, to which the unit tile 1 is applied, while pressing the layer 3 against the surface so as not to allow air to enter or intervene therebetween for attaining hermetical attachment. Thus, pretty, three-dimensional or somehow voluminous decoration on walls etc. can be attained in an easy and simple way.

In especial, this first form of unit tile according to the present invention is comprised of a single tile member 2, so that it is suitably used for partial or local patching or repair for breakage on walls etc.

Figure 2:
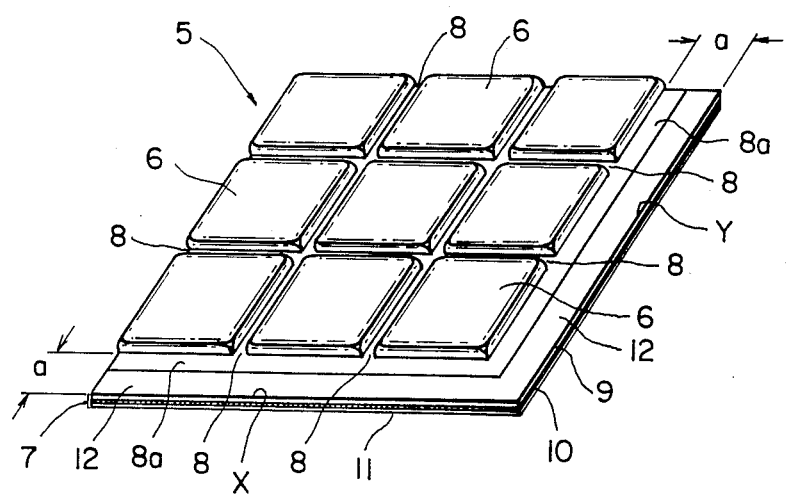
FIG. 2 is a perspective view of a second form of unit tile embodying the present invention.

FIG. 2 is a perspective view of a second form of unit tile embodying the present invention. The unit tile 5 comprises tile members 6 which are each made of soft vinyl chloride resin sheet of about 1.2 mm in thickness and diecut or blanked in the shape of square. The soft vinyl chloride resin sheet used for the tile members 6 is mildew-proofed and covered with clear coating, which is prepared from a composition of acrylic polyol, additives and a solvent and a stiffener such as polyisocyanate. The tile mmbers 6 are regularly arranged and attached on a surface of a substrate 7, where an acrylic emulsion adhesive is applied, leaving spaces 8 corresponding to joints between the respective tile members 6, 6. The surface of the adhesive exposed at the spaces 8 between the tile members 6 is applied with a white acrylic emulsion coating to make the spaces 8 non-sticky.

The substrate 7 comprises a sheet member 9 which is made of soft vinyl chloride resin having a thickness of about 0.1 mm. The rear side of the sheet member 9 is applied with an acrylic emulsion adhesive to form an adhesive layer or surface 10. The adhesive surface 10 is covered and protected by a release sheet 11 of silicone laminate.

In the attachment of the tile members 6, 6 on the surface of the substrate 7, the tile members 6, 6 are so disposed that there may be left margins of width along the adjacent edges X and Y of the substrate 7. The resultant adhesive-exposed portions along the edges X and Y are covered by release papers 12 of silicone laminate, with strips 8a having a width corresponding to the joint left uncovered along the peripheries of the tile members 6, 6. The marginal portions covered by the release sheets 12 may be used as margins or overlaps for splicing of the unit tiles. The adhesive-exposed portions 8a corresponding to the joints are then applied with a white acrylic emulsion coating to make the portions non-sticky.

Figure 3:
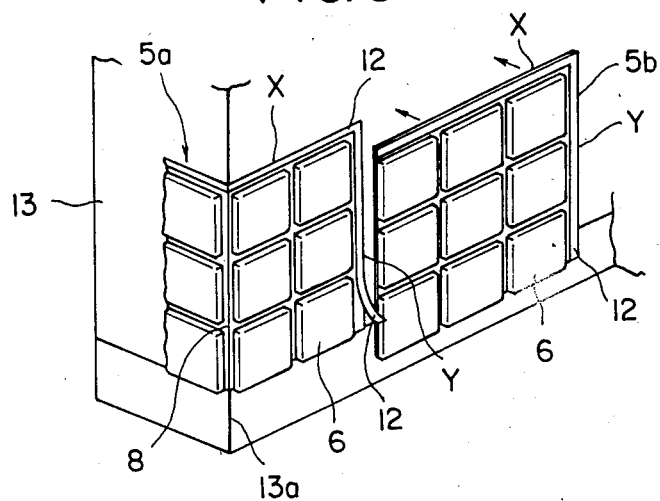
FIG. 3 is an explanatory view showing the setting of the second form of unit tile onto a wall to decorate the same.
Figure 4:
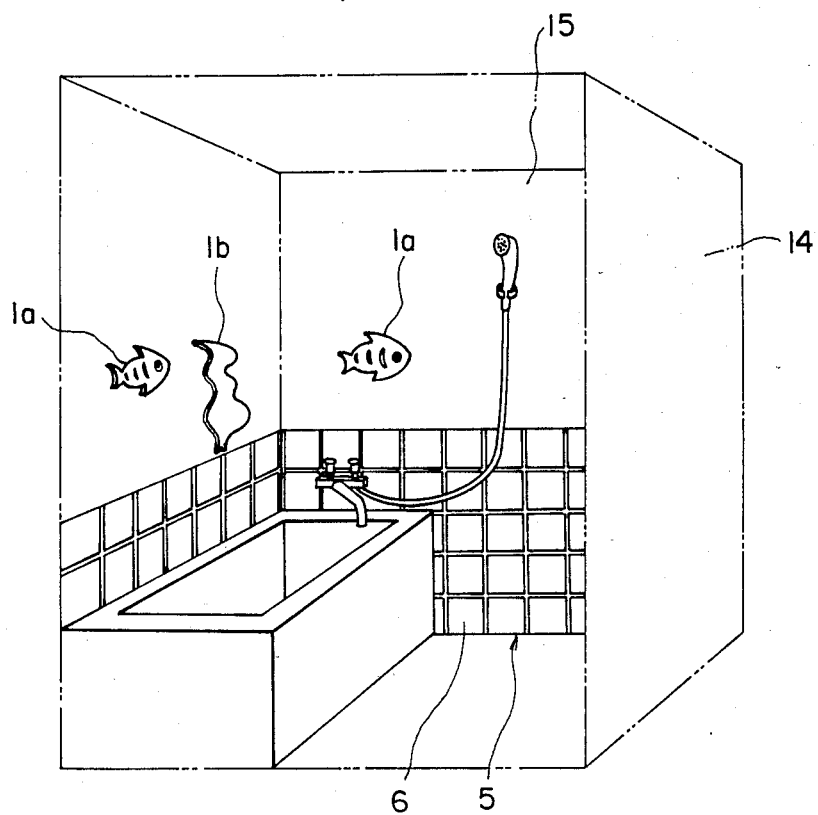
FIG. 4 is a perspective view showing the application of the first and second forms of unit tile to a unit bathroom.

In order to apply the unit tiles 5 as described above to a wall etc., the release paper 11 on the rear side of the substrate 7 is first removed to expose the adhesive surface 10 and the exposed adhesive surface 10 is pressed against a setting bed 13 of the wall to be adhesively set on the wall as illustrated in FIG. 3.

In these application procedures, the unit tiles 5 (5a, 5b in FIG. 3) are set on the setting bed 13, in order, from the bottom thereof. More specifically, a unit tile 5a is set so that the marginal portions covered by the release papers 12 may be positioned top and right as illustrated in FIG. 3.

When the unit tile 5a is applied to the angle portion 13a of the setting base 13, the unit tile 5a is bent, at the space portion 8 between the tile members 6, 6, so as to fit or conform to the angle portion 13a.

After completion of the setting of the unit tile 5a to the setting bed 13, the release papers 12 on the unit tile 5a are peeled off to expose the adhesive coated surface which has been covered by the release papers 12.

Thereafter, the release paper 11 on the rear side of another unit tile 5b is removed to expose the adhesive-coated surface, and the unit tile 5b is set so that the rear side of the unit tile 5b may be placed, with the edges other than the edges X and Y, where the peripheral edges of the tile members coincide with the peripheral edges of the sheet member 9, while partly overlapping the marginal portion of the first unit tile 5a. Since each of the sheet members 9 is as thin as 0.1 mm, the unit tiles can be spliced without causing substantial increase of thickness at the spliced portions, or forming substantial steps at the spliced portions.

As can be easily inferred from the foregoing description, a plurality of unit tiles 5a, 5b . . . 5n may be spliced so as to extend vertically and laterally, to completely cover the setting wall 13 with these decorative beautiful unit tiles.

In this connection, it is to be noted that when there is an obstacle on the setting wall 13, the unit tile 5 may be cut, by a knife or scissors, to have a cutout of complementary shape. Thus, the unit tile 5 may easily be conformed with the conditions of the setting wall 13.

As described above, the first invention features the unit tile having such a simple configuration that the adhesive surface is provided on the rear side of the tile member of any desired shape and having a suitable thickness and flexibility and the release paper is attached to the surface of the adhesive on the tile member.

For use of the tile member, the release paper on the rear side of the tile member is first removed to expose the adhesive surface and the adhesive surface is pressed against the walls etc. By this simple operation, there can be obtained an appropriately voluminous pretty decoration on the walls.

According to the second feature of the present invention, a plurality of tile members made of synthetic resins and having a desired thickness and flexibility are adhesively attached on the surface of the substrate having a suitable stiffness or rigidity and having the adhesive surface on the rear side thereof. The tile members are disposed on the surface of the substrate, leaving the spaces corresponding to the joints between the respective tile members. The adhesive surface of the rear side of the substrate is covered by the release paper.

With this configuration, simple procedures of removing the release paper on the rear side of the substrate to expose the adhesive surface and pressing the adhesive surface against the wall etc. attains beautiful, voluminous decoration on the walls etc. only by a job on the do-it-yourself basis.

In especial, according to the second feature of the present invention, the tile members of synthetic resins having an appropriate thickness and flexibility are attached to the substrate having some stiffness which has the adhesive surface on the rear side thereof. The adhesive surface is covered by the release paper to protect the same. The so configured unit tile is very thin and can be easily cut, so that the unit tile can be cut in any suitable shape according to the conditions of the walls etc. Each of the unit tile of this feature may preferably have marginal portions usable as overlap widths for splicing, so that even nonprofessionals could easily and accurately set the unit tiles on the walls etc., splicing them. The appearance of the unit tiles thus set on the walls is by no means worse than that of the conventional tile set on the walls.

In addition, the tile members of the unit tile may preferably be mildew-proofed. In this case, the unit tile can suitably be used especially for places, where water is used, such as bathrooms, kitchens, toilets, washrooms, etc. The surfaces of the tile members may preferably be coated with clear coating to prevent possible sticking of dusts onto the surfaces due to static electricity, or scratches on the surfaces.

I claim:

1. A unit tile for decoration and protection of interior walls which comprises a substrate formed of a sheet member of a synthetic resin having a suitable rigidity, an adhesive layer coated on an entire rear side of the sheet member and a release paper attached to a surface of the adhesive layer to protect the adhesive layer; and a plurality of tile members each made of a synthetic resin and having a desired thickness and flexibility; said tile members being adhesively attached on a surface of the substrate, leaving spaces between the respective tile members.

2. The unit as claimed in claim 1, in which said tile members are mildew-proofed.

3. The unit tile as claimed in claim 1, in which said tile members are coated with a two-part urethane clear coating.

4. The unit tile as claimed in claim 2, in which said tile members are coated with a two-part urethane clear coating.

5. The unit tile as claimed in claim 1, in which said substrate has, on a surface thereof, another adhesive layer and said tile members are attached to the substrate through the adhesive layer, said spaces between the respective tile members, where the adhesive layer is exposed, being applied with powder or liquid synthetic resin to render the spaces non-sticky.

6. The unit tile as claimed in claim 2, in which said substrate has, on a surface thereof, another adhesive layer and said tile members are attached to the substrate through the adhesive layer, said spaces between the respective tile members, where the adhesive layer is exposed, being applied with powder or liquid synthetic resin to render the spaces non-sticky.

7. The unit tile as claimed in claim 3, in which said substrate has, on a surface thereof, anothe adhesive layer and said tile members are attached to the substrate through the adhesive layer, said spaces.between the respective tile members, where the adhesive layer is exposed, being applied with powder or liquid synthetic resin to render the spaces non-sticky.

8. The unit tile as claimed in claim 1, in which said substrate is formed in square or right-angled tetragon and said tile members are disposed on the substrate, leaving margins along at least two adjacent edges of the substrate, said margins having adhesive surfaces and said adhesive surfaces being covered by release paper, leaving strips of adhesive surfaces along the peripheral edges of the tile members.

9. The unit tile as claimed in claim 2, in which said substrate is formed in square or right-angled tetragon shape and said tile members are disposed on the substrate, leaving margins along at least two adjacent edges of the substrate, said margins having adhesive surfaces and said adhesive surfaces being covered by release paper, leaving strips of adhesive surfaces along the peripheral edges of the tile members.

10. The unit tile as claimed in claim 3, in which said substrate is formed in square or right-angled tetragon shape and said tile members are disposed on the substrate, leaving margins along at least two adjacent edges of the substrate, said margins having adhesive surfaces and said adhesive surfaces being covered by release paper, leaving strips of adhesive surfaces along the peripheral edges of the tile members 11. The unit tile as claimed in claim 5, in which said substrate is formed in square or right-angled tetragon shape and said tile members are disposed on the substrate, leaving margins along at least two adjacent edges of the substrate, said margins having adhesive surfaces and said adhesive surfaces being covered by release paper, leaving strips of adhesive surfaces along the peripheral edges of the tile members.

12. A unit tile for decoration and protection of interior walls which comprises a substrate formed of a sheet member of a synthetic resin having a suitable rigidity, an adhesive layer coated on a rear side of the sheet member and a release paper attached to a surface of the adhesive layer to protect the adhesive layer; and a plurality of tile members each made of a synthetic resin and having a desired thickness and flexibility; said tile members being adhesively attached on a surface of the substrate, and having spaces between the respective tile members, said unit tile capable of bending at said spaces between tile members.

* * * * *